(12) United States Patent
Albl et al.

(10) Patent No.: US 11,274,704 B2
(45) Date of Patent: Mar. 15, 2022

(54) SEALING ARRANGEMENT FOR A WHEEL BEARING ARRANGEMENT OF A MOTOR VEHICLE

(71) Applicant: AUDI AG, Ingolstadt (DE)

(72) Inventors: Johannes Albl, Ingolstadt (DE);
Michael Frisch, Schönberg (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/961,817

(22) PCT Filed: Jan. 14, 2019

(86) PCT No.: PCT/EP2019/050816
§ 371 (c)(1),
(2) Date: Jul. 13, 2020

(87) PCT Pub. No.: WO2019/138109
PCT Pub. Date: Jul. 18, 2019

(65) Prior Publication Data
US 2021/0079954 A1 Mar. 18, 2021

(30) Foreign Application Priority Data

Jan. 15, 2018 (DE) ...................... 10 2018 200 603.2

(51) Int. Cl.
*F16C 33/78* (2006.01)
*B60B 27/00* (2006.01)

(52) U.S. Cl.
CPC ...... *F16C 33/7826* (2013.01); *B60B 27/0073* (2013.01); *F16C 2223/32* (2013.01);
(Continued)

(58) Field of Classification Search
CPC .............. F16C 33/7826; F16C 2326/02; F16C 2240/54; F16C 2240/60; F16C 2223/32; B60B 27/0073
See application file for complete search history.

(56) References Cited

U.S. PATENT DOCUMENTS

| 3,944,305 A * | 3/1976 | Asberg ................ B60B 27/0005 384/482 |
| 6,334,713 B1 * | 1/2002 | Chu ..................... F16J 15/3268 384/464 |

(Continued)

FOREIGN PATENT DOCUMENTS

| CN | 104160167 A | 11/2014 |
| DE | 10132429 A1 | 2/2002 |

(Continued)

OTHER PUBLICATIONS

Machine Translation of JP-2010190282-A (Year: 2010).*
(Continued)

*Primary Examiner* — Alan B Waits
(74) *Attorney, Agent, or Firm* — Maier & Maier, PLLC

(57) ABSTRACT

A seal arrangement for a wheel bearing arrangement of a motor vehicle, including a seal body having a sealing lip, wherein the seal body is arranged on a fixed component of the wheel bearing arrangement and the sealing lip abuts a sealing surface of a rotating component of the wheel bearing arrangement. The disclosure is distinguished in that a film is applied to the sealing surface.

10 Claims, 2 Drawing Sheets

(52) U.S. Cl.
CPC ...... *F16C 2240/54* (2013.01); *F16C 2240/60* (2013.01); *F16C 2326/02* (2013.01)

(56) References Cited

U.S. PATENT DOCUMENTS

| | | | | |
|---|---|---|---|---|
| 7,264,249 | B2* | 9/2007 | Yokoyama | F16J 15/3284 277/549 |
| 9,623,703 | B2* | 4/2017 | Shibata | F16C 33/7879 |
| 2013/0182984 | A1* | 7/2013 | Masuda | B21K 1/40 384/484 |
| 2014/0037239 | A1* | 2/2014 | Duch | F16J 15/3456 384/480 |
| 2014/0346850 | A1* | 11/2014 | Shibata | F16C 33/7826 301/109 |
| 2016/0003302 | A1* | 1/2016 | Seno | F16C 33/7886 277/351 |
| 2018/0186181 | A1* | 7/2018 | Tada | F16J 15/3232 |

FOREIGN PATENT DOCUMENTS

| | | | |
|---|---|---|---|
| DE | 102009043031 A1 | 4/2010 | |
| DE | 102012001379 A1 | 9/2012 | |
| EP | 2759620 A1 | 7/2014 | |
| JP | H09-79274 A | 3/1997 | |
| JP | 2002227856 A * | 8/2002 | ........ F16C 33/7883 |
| JP | 2003-262231 A | 9/2003 | |
| JP | 2006-214920 A | 8/2006 | |
| JP | 2009-180366 A | 8/2009 | |
| JP | 2009180366 A * | 8/2009 | ........... F16C 33/583 |
| JP | 2010190282 A * | 9/2010 | ........... F16C 33/586 |

OTHER PUBLICATIONS

Machine Translation of JP-2009180366-A (Year: 2009).*
Machine Translation of JP-2002227856-A (Year: 2002).*
Machine Translation of DE 102012001379 (Year: 2012).*
International Preliminary Report on Patentability dated Jul. 21, 2020, including the Written Opinion of the International Searching Authority, in connection with corresponding international Application No. PCT/EP2019/050816 (7 pp.).
German Examination Report dated Nov. 9, 2018 in corresponding German Application No. 10 2018 200 603.2; 12 pages; Machine translation attached.
International Search Report with English translation and Written Opinion with Machine translation dated Apr. 25, 2019 in corresponding International Application No. PCT/EP2019/050816; 19 pages.
Chinese Office Action dated Oct. 9, 2021, in connection with corresponding CN Application No. 201980008332.5 (12 pp., including machine-generated English translation).

* cited by examiner

SEALING ARRANGEMENT FOR A WHEEL BEARING ARRANGEMENT OF A MOTOR VEHICLE

FIELD

The disclosure relates to a seal arrangement for a wheel bearing arrangement of a motor vehicle.

BACKGROUND

A sealing arrangement, which acts between a fixed component of the wheel bearing arrangement and a rotating component of the wheel bearing arrangement, and which generally comprises a seal body having a sealing lip, is generally known to be associated with the wheel bearings of a motor vehicle, wherein the seal body is arranged on the fixed component of the wheel bearing arrangement and the sealing lip abuts a sealing surface formed on the rotating component of the wheel bearing arrangement. Reference is made to DE 101 32 429 A1 solely by way of example.

Depending on the design of the wheel bearing arrangement, the sealing lip of the seal body can abut or rotate around either directly on the wheel hub or alternatively on a stainless steel flinger plate. A prerequisite for maintaining the sealing effect is that the sealing surface on which the sealing lip abuts or rotates around has a high, substantially defined surface quality to prevent the so-called conveying effect, namely an entry of water below the sealing lip. If the sealing lip rotates directly on the wheel hub, this means that the wheel hub has to be machined or ground accordingly in this region to ensure the required surface quality. This proves to be disadvantageous since the grinding process required for this purpose causes additional costs and the geometry thus cannot be chosen freely, since the grinding stones have to be guided radially inward to the wheel bearing axis of rotation. The variant of rotating the sealing lip around on a stainless steel flinger plate has also proven to be disadvantageous since generally a ground, long, cylindrical press fit is required for fastening the stainless steel flinger plate on the wheel hub, which is again correspondingly costly to produce. Further disadvantages of this variant are that the flinger plate requires a relatively large amount of installation space both in the axial direction and also in the radial direction and rust penetration can occur on the static press fit.

SUMMARY

The disclosure is based on the object of refining a seal arrangement for a wheel bearing arrangement of a motor vehicle in such a way that a very good seal performance is ensured with low costs and little space requirement.

In a known manner, the seal arrangement for a wheel bearing arrangement of a motor vehicle comprises a seal body having a sealing lip, which is arranged on a fixed component of the wheel bearing arrangement, and the sealing lip of which is aligned on a rotating component of the wheel bearing arrangement and is in sliding contact with a sealing surface on the rotating component of the wheel bearing arrangement.

According to the invention, a film is applied to the sealing surface, with which the sealing lip is then in sliding contact or on which the sealing lip runs.

The word film is to be understood hereafter very generally as a thin layer of a substance/material having a layer thickness ≤0.3 mm.

An advantage of the design according to the invention is that a friction-optimized adjustment of the surface of the sealing surface is enabled in a simple manner by appropriate selection of the film or the surface quality of the film. A further advantage of the design according to the invention is that—since now a grinding process or cylindrical seat is no longer required for the flinger plate—a significantly less expensive production is ensured, and significantly less installation space is required (=>no wasted space for flinger plate in the axial and radial direction).

The film is preferably formed thin-layered, having a layer thickness ≤0.2 mm, preferably ≤0.1 mm.

The film is preferably connected here to the sealing surface in a materially-bonded manner, in particular by means of adhesive bonding, and/or in a friction-locked manner, for example, by means of shrinking. This advantageously ensures that the film is fastened inexpensively and quickly on the sealing surface.

According to one particularly advantageous embodiment of the invention, the film is made of plastic, low-corrosion metal, or composite material. In addition to high resistance to corrosion, this also ensures good deformability of the film in particular. It is also advantageous that, due to the above design, the film is low-wear and thus a long service life is ensured.

A further preferred embodiment of the invention provides that the film has a surface quality having a roughness depth of Rz<10 μm. This has the positive effect that low wear can be combined with good friction properties.

The fixed component of the wheel bearing arrangement is preferably a fixed bearing ring of a roller bearing and the rotating component of the wheel bearing arrangement having the sealing surface is a wheel hub.

A particularly compact and space-saving embodiment is distinguished in that a circumferential groove extending in the axial direction is introduced into the wheel hub, the bottom surface or base of the groove forming the sealing surface having the film.

Further advantages and possible applications of the present invention will be apparent from the following description in conjunction with the exemplary embodiments illustrated in the drawings.

In the figures:

DETAILED DESCRIPTION

Figure 1:
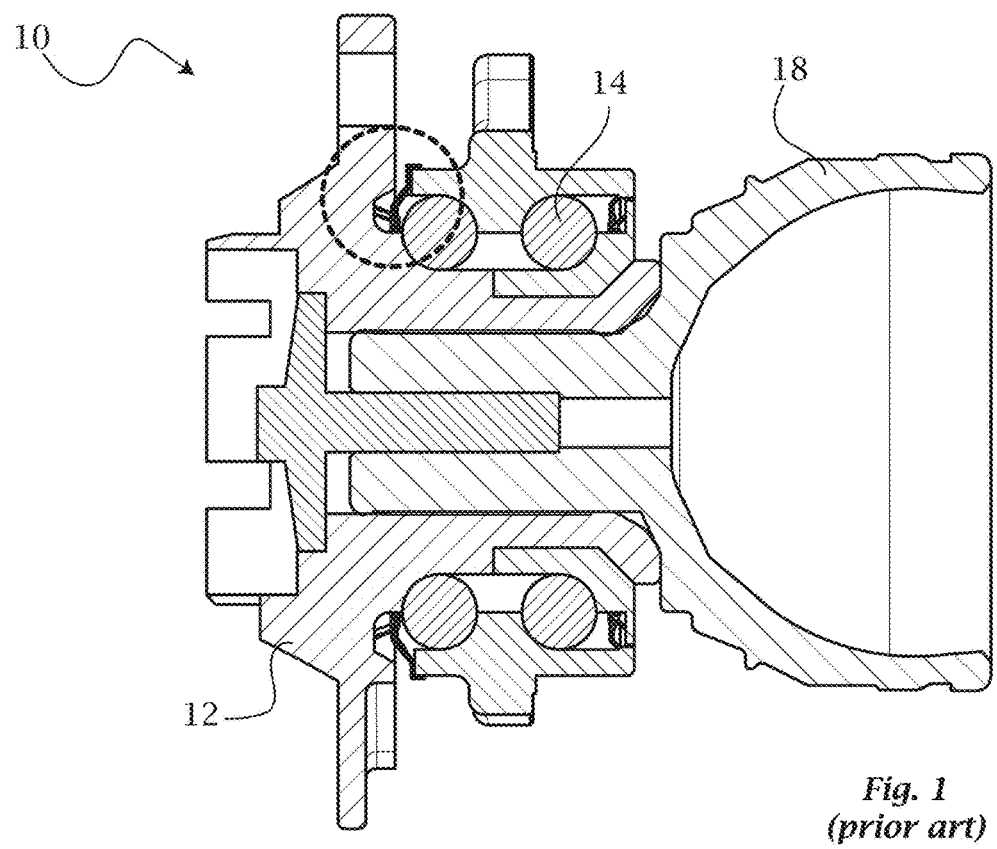
FIG. 1 shows a side view of a seal arrangement for a wheel bearing arrangement of a motor vehicle according to the prior art.

FIG. 1 shows a wheel bearing arrangement of a motor vehicle identified as a whole by the reference numeral 10. In a known manner, a wheel hub 12 is rotatably mounted via a roller bearing 14. The wheel hub 12 in turn has a drive connection to an articulated shaft 18.

Figure 2:
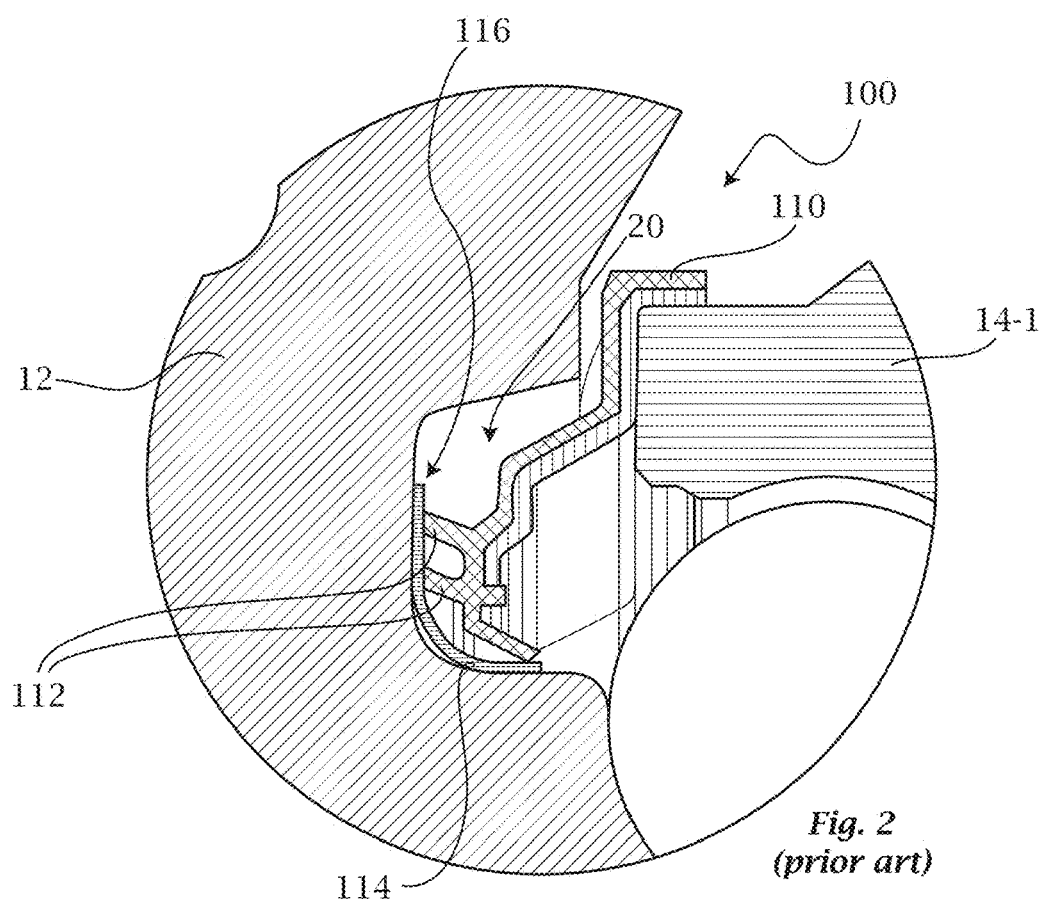
FIG. 2 shows an enlarged illustration of the circled detail from FIG. 1.

In this case—as shown in FIG. 1 and FIG. 2—a seal arrangement identified as a whole by the reference numeral 100 is arranged between the rotating part of the wheel bearing arrangement 10, the wheel hub 12 here, and the fixed component of the wheel bearing arrangement 10, the fixed bearing ring 14-1 of the roller bearing 14 here.

The seal arrangement 100 comprises a seal body 110 having two sealing lips 112, which is formed from elastomer and is mounted on the fixed bearing ring 14-1 of the roller bearing 14. As can be seen in particular in FIG. 2, the sealing lips 112 abut under pre-tension a flinger plate 114, which is arranged in a groove 20 of the wheel hub 12, is fastened in a rotationally-fixed manner to the wheel hub 12, and is made of stainless steel. That is, the sealing lips 112 are in sliding contact with the rotating sealing surface 116 formed on the flinger plate.

A disadvantage of the prior art is in particular that, due to the flinger plate 114, the seal arrangement 100 is expensive to produce (installation of the flinger plate), and that the flinger plate 114 requires a comparatively large amount of installation space in the axial and radial direction a, r.

Figure 3:
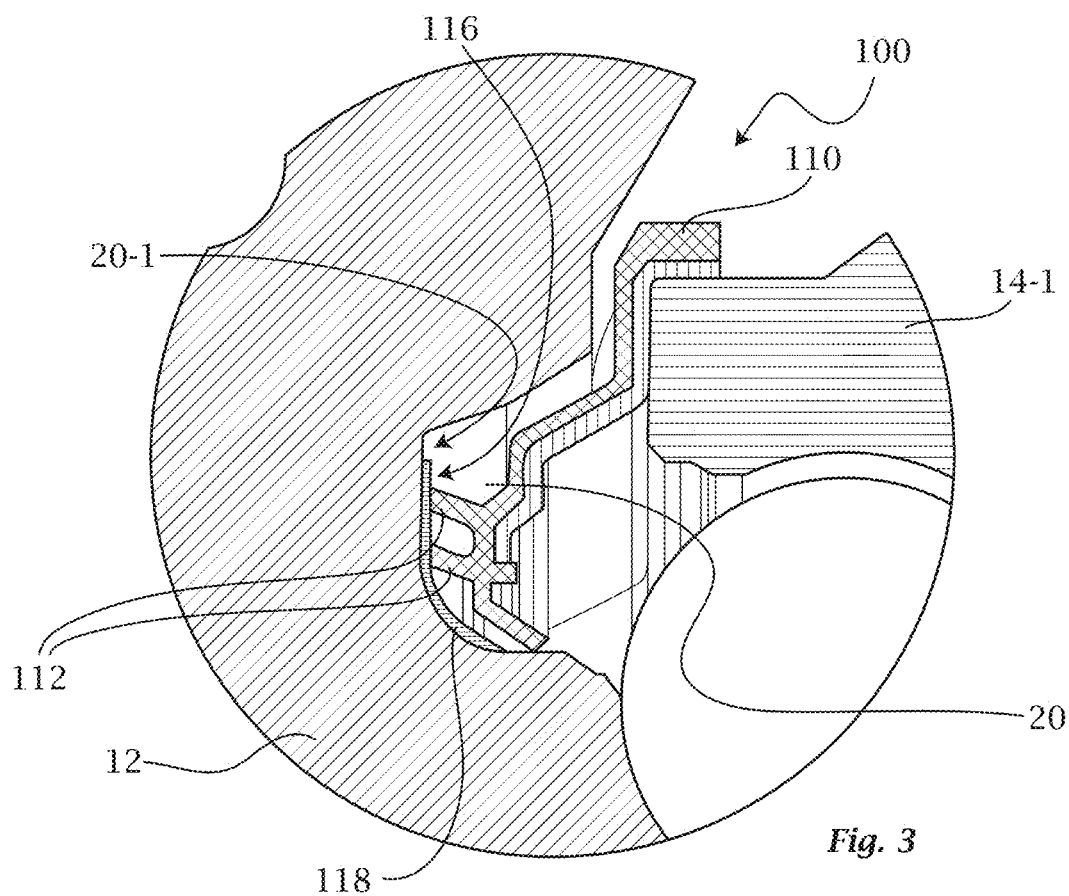
FIG. 3 shows an embodiment according to the invention of the seal arrangement.

As FIG. 3 shows, the groove base 20-1 of the groove 20 in the wheel hub 12 is provided with a film 118. That is, the sealing lips 112 are in sliding contact with the film 118 forming the rotating sealing surface 116. In the present case, the film 118 is a film made of a composite material having a layer thickness <0.2 mm, which was fastened by means of adhesive bonding and thus particularly inexpensively to the groove base 20-1 of the groove 20 of the wheel hub 12.

By means of the film 118, the friction-optimized adjustment of the sealing elements sealing lips 112 and sealing surface 116 necessary for an optimal sealing effect is now advantageously possible in a simple manner.

For the sake of completeness, it is to be noted that the groove 20 can now also be made significantly smaller both in the axial direction a and in the radial direction r, so that the seal arrangement 100 according to the invention also requires significantly less installation space.

The invention claimed is:

1. A seal arrangement for a wheel bearing arrangement of a motor vehicle, comprising:
    a seal body having a plurality of sealing lips, wherein the seal body is arranged on a fixed component of the wheel bearing arrangement and at least one sealing lip abuts a sealing surface of a rotating component of the wheel bearing arrangement, wherein a film is applied to the sealing surface; and
    wherein the film is connected to the sealing surface via an adhesive and/or a friction-locked connection, wherein the film co a first of the plurality of sealing lips but does not contact a second of the plurality of sealing lips, and
    wherein the fixed component of the wheel bearing arrangement is a fixed bearing ring of a roller bearing and the rotating component of the wheel bearing arrangement having the sealing surface is a wheel hub, the wheel hub comprising a circumferential groove, wherein the circumferential groove comprises a recess extending in the axial direction, wherein a base of the recess forms the sealing surface.

2. The seal arrangement as claimed in claim 1, wherein the film has a layer thickness (d) of ≤0.3 mm.

3. The seal arrangement as claimed in claim 2, wherein the film is made of plastic, metal, or composite material.

4. The seal arrangement as claimed in claim 2, wherein the film has a surface quality having a roughness depth (Rz) of Rz<10 μm.

5. The seal arrangement as claimed in claim 1, wherein the friction-locked connection is produced by means of shrinking.

6. The seal arrangement as claimed in claim 5, wherein the film is made of plastic, metal, or composite material.

7. The seal arrangement as claimed in claim 5, wherein the film has a surface quality having a roughness depth (Rz) of Rz<10 μm.

8. The seal arrangement as claimed in claim 1, wherein the film is made of plastic, metal, or composite material.

9. The seal arrangement as claimed in claim 8, wherein the film has a surface quality having a roughness depth (Rz) of Rz<10 μm.

10. The seal arrangement as claimed in claim 1, wherein the film has a surface quality having a roughness depth (Rz) of Rz<10 μm.

* * * * *